(12) United States Patent
Tatsuno

(10) Patent No.: US 7,852,522 B2
(45) Date of Patent: Dec. 14, 2010

(54) ORIGINAL-DOCUMENT ILLUMINATION APPARATUS, IMAGE READING APPARATUS, COLOR-ORIGINAL-DOCUMENT READING APPARATUS, AND IMAGE FORMING APPARATUS

(75) Inventor: Hibiki Tatsuno, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 808 days.

(21) Appl. No.: 11/878,858

(22) Filed: Jul. 27, 2007

(65) Prior Publication Data

US 2008/0049207 A1    Feb. 28, 2008

(30) Foreign Application Priority Data

Jul. 28, 2006    (JP)    ............... 2006-206148

(51) Int. Cl.
*H04N 1/04* (2006.01)

(52) U.S. Cl. .............. 358/475; 358/474; 358/497; 358/498

(58) Field of Classification Search ........... 358/475, 358/474, 497, 498
See application file for complete search history.

(56) References Cited

U.S. PATENT DOCUMENTS

| | | | | |
|---|---|---|---|---|
| 7,438,443 | B2 * | 10/2008 | Tatsuno et al. | 362/297 |
| 7,527,394 | B2 * | 5/2009 | Tatsuno | 362/268 |
| 7,697,762 | B2 * | 4/2010 | Tatsuno | 382/190 |
| 2005/0111115 | A1 | 5/2005 | Tatsuno et al. | |
| 2006/0007417 | A1 | 1/2006 | Tatsuno | |
| 2006/0044795 | A1 | 3/2006 | Tatsuno | |
| 2007/0024977 | A1 | 2/2007 | Kawamura et al. | |

FOREIGN PATENT DOCUMENTS

| | | |
|---|---|---|
| JP | 2725650 | 12/1997 |
| JP | 11-232912 | 8/1999 |
| JP | 2004-361425 | 12/2004 |
| JP | 3659770 | 3/2005 |
| JP | 2005-278132 | 10/2005 |
| JP | 2005-311662 | 11/2005 |
| JP | 2006-071817 | 3/2006 |
| JP | 2006-084753 | 3/2006 |
| JP | 2006-330328 | 12/2006 |
| JP | 2007-047335 | 2/2007 |
| JP | 2007-047418 | 2/2007 |
| JP | 2007-047707 | 2/2007 |
| JP | 2007-058163 | 3/2007 |
| JP | 2007-072172 | 3/2007 |
| JP | 2007-333856 | 12/2007 |
| JP | 2008-32907 | 2/2008 |

* cited by examiner

*Primary Examiner*—Houshang Safaipour
(74) *Attorney, Agent, or Firm*—Dickstein Shapiro LLP

(57) ABSTRACT

Provided is an original-document illumination apparatus which includes: an illuminated area having a length and a width; a light-source unit including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, wherein a longitudinal direction of the convergent lengthy lens corresponds to the main-scanning direction, wherein at least one of a light-incident plane and a light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

10 Claims, 11 Drawing Sheets

ORIGINAL-DOCUMENT ILLUMINATION APPARATUS, IMAGE READING APPARATUS, COLOR-ORIGINAL-DOCUMENT READING APPARATUS, AND IMAGE FORMING APPARATUS

PRIORITY CLAIM

The present application is based on and claims priority from Japanese Application Number 2006-206148, filed Jul. 28, 2006, the disclosure of which is hereby incorporated by reference herein in its entirety.

BACKGROUND

The present invention relates to an original-document illumination apparatus used for digital copiers and image scanners, and also relates to an image reading apparatus, a color-original-document reading apparatus, and an image forming apparatus, in each of which the original-document illumination apparatus is used.

Development of Light Emitting Diodes (LEDs) has been advanced recently, and LEDs are getting more and more luminous dramatically. LEDs, in general terms, have such advantages as longer service life, higher efficiency, higher resistance to impact, and their capability of emitting monochromatic lights. For this reason, application of LEDs to a variety of lightening purposes is expected. Among other purposes, LEDs are actually used in an original-document illumination apparatus included in an image reading apparatus such as a digital copier and an image scanner.

Despite the above-mentioned excellent properties, a single LED cannot emit light that is luminous enough to be used in an illumination apparatus of an image reading apparatus. Accordingly, LEDs are used mainly for such apparatuses as a lower-speed reading apparatus and an apparatus with more emphasis on its compactness. Meanwhile, mainly used for higher-speed reading apparatuses and in larger apparatuses are cold cathode fluorescent lamps.

The above-mentioned problem of LEDs is generally dealt with by use of many LEDs arranged into an array to obtain increased amount of light from the LED array as a whole. In this case, however, the light spreads so widely as to lessen the efficiency and to contradict the promotion of energy saving products. Use of round lamp type LEDs, which suffers less from the spread of their light, may possibly enhance efficiency, but the light emitted from an LED of that type is irradiated in a direction at a narrower angle, so that an uneven luminance distribution occurs in the main-scanning direction.

In an already-proposed original-document illumination apparatus, such as inventions disclosed in Japanese Patent Application Laid-open Publications Nos. H11-232912 and H08-111545, an LED array and a lengthy lens are combined to accomplish more efficient use of light. The improvement in efficiency is generally pursued by making the light from LEDs converge on a sub-scanning cross section of the LEDs. Such a method, however, has a problem. As a drawing of Japanese Patent Application Laid-open Publication No. H11-232912 shows, the center portion of the convergent light is bright, but a rapid drop in luminance is observed at a position away from the center. In this method, among the light emitted from the LEDs, most of the light emitted at an oblique angle to the sub-scanning cross section is wasted, so that an uneven luminance distribution occurs in the main-scanning direction unless many LEDs are arranged.

Incidentally, some original-document illumination apparatuses employ cylindrical lenses. Also in this case, an uneven luminance distribution occurs in the main-scanning direction. FIGS. 1 and 2 describe how an uneven luminance distribution in the main-scanning direction occurs in an original-document illumination apparatus equipped with a cylindrical lens 4 and an LED 3. FIG. 1 illustrates a vertical cross section, and FIG. 2 illustrates a horizontal cross section. Light beams illustrated as solid lines in FIGS. 1 and 2 represent divergent light beams each of which is emitted from the LED 3 and each of which enters the cylindrical lens 4 in a single sub-scanning cross section including the LED 3. In other words, these solid lines represent perpendicular incident light 1a. The dotted lines in FIGS. 1 and 2 represent divergent light beams emitted in a cross-sectional direction at an oblique angle θ illustrated in FIG. 2 with the sub-scanning cross section including the LED 3. In other words, these dotted lines represent oblique incident light 1b.

FIG. 1 illustrates that the arrangement of the LED 3 relative to the cylindrical lens 4 is not changed between the case of the perpendicular incident light 1a and the case of the oblique incident light 1b. After passing through the cylindrical lens 4, the perpendicular incident light 1a, represented by the solid lines, enters a contact glass 5 as a parallel light. Meanwhile, the oblique incident light 1b, represented by the dotted lines, converge on the contact glass 5, after passing through the cylindrical lens 4.

This is because, as FIG. 2 illustrates, the perpendicular incident light 1a of the solid lines and the oblique incident light 1b of the dotted lines pass through the cylindrical lens 4 via different routes. The difference in route derives from the following face. The oblique incident light 1b of the dotted lines passes diagonally across the cylindrical lens 4, so that the light beam of the oblique incident light 1b has a large apparent curvature of the light incident plane and that of the light output plane (i.e., the curvature radius of each planes becomes shorter).

Now, assume that the LED 3 has a light distribution (angular distribution of the intensity of light irradiation) of, for example as FIG. 3 illustrates, a distribution according to Beer-Lambert Law (as the angle Φ becomes larger, the light intensity of the LED 3 is decreased from the largest light intensity in the front direction in proportion to the value of cos Φ). In this case, when only this single LED 3 and the cylindrical lens 4 are used to illuminate the contact glass 5, the illuminance distribution in a luminance measurement area 6 illustrated in FIG. 2 in the main-scanning direction X has peaks as FIG. 4 represents.

To counter the uneven luminance distribution in the main-scanning direction, the present applicant proposed an invention disclosed in Japanese Patent Application Laid-open Publication No. H10-322521, but there is no mention as to how to condense light in the sub-scanning direction. In Addition, the present applicant proposed another invention, as disclosed in Japanese Patent Application Laid-open Publication No. 2004-361425 with a configuration having a light guiding member, as an optical element, that has its light incident plane arranged near the light output plane of the light beams emitted from a point light source, and its light output plane faced towards the reading area. According to this configuration, the favorable, targeted distribution of luminance is obtained. The apparatus, however, needs a rather complex structure as it uses reflector plates in addition to the light guiding member. This requires a higher cost.

The present applicant proposed a still another invention as disclosed in Japanese Patent Application Laid-open Publication No. 2005-278132. An original-document illumination apparatus disclosed therein is equipped with a light-source unit in which LEDs with a certain distribution of luminous intensity are installed as arranged in a plurality of rows, and is also equipped with a lengthy lens that does not make the light passing therethrough converge in the direction of the sub-scanning cross-section. The light-source unit and the lengthy lens are appropriately arranged so that the light emitted from each of the LEDs is made to converge not at a position on the area of the original-document on the corresponding sub-scanning cross section to the same LED. Rather, the light is made to converge at another position on the area of the original-document, and the position is shifted in the main-scanning direction so that an angle is made with the sub-scanning cross section. The original-document illumination apparatus thus obtained has a high convergence of light in the sub-scanning direction, allows a larger numerical aperture (NA), and suffers from a less loss due to the spreading of light in the main-scanning direction. In sum, the proposed original-document illumination apparatus accomplishes less unevenness in luminance distribution with a relatively small number of LEDs.

The invention disclosed in Japanese Patent Application Laid-open Publication No. 2005-278132 has advantages mentioned above, but also has some drawbacks. For example, the acute manner of converging the light at a position on the area of the original-document, when combined with a misalignment of illuminating position caused, for example, by an incorrect angle with which the lengthy lens is attached, may cause a big change in light quantity that reaches a light detector of a line sensor. This may possibly affect the image to be formed by the apparatus. For this reason, it is preferable that, in the original-document illumination apparatus used in image forming apparatuses such as a digital copier and an image scanner, the illumination-intensity-distribution curve in the sub-scanning direction be wide to some extent. The curve is preferable because no difference in luminous intensity within the reading area is caused even when the center position of illumination is displaced from the reading part. To this end, there may preferably be a flat section in the intensity curve near the section with the maximum value in the distribution of luminous intensity. In the flat section, less unevenness in luminous intensity occurs over the width larger than the width formed by adding the width needed for the reading and the margin for accommodating the mechanical error and the like. For example, 1-mm flat portion on each side is preferable.

For the foregoing reasons, there is a need for an original-document illumination apparatus, an image reading apparatus, a color-original-document reading apparatus, and an image forming apparatus that each has a flat portion of a necessary width near the maximum value in the luminous-intensity-distribution curve, so that the apparatus does not suffer from the influence of the mechanical error or causes no difference in luminous intensity within the reading area, and, in addition, the apparatus is simple in its structure, and high in light-use efficiency.

SUMMARY

The present invention is directed to an original-document illumination apparatus, an image reading apparatus, a color-original-document reading apparatus, and an image forming apparatus that satisfy this need.

To achieve these and other advantages and in accordance with the purpose of the invention, as embodied and broadly described herein, the invention provides an original-document illumination apparatus, comprising: an illuminated area having a length and a width; a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

Advantageously, the specific light-flux-passing-surface shape cyclically varies in accordance with the positions of the specific light-flux-passing-surface shape in the main-scanning direction.

Advantageously, a cycle of variation of the specific light-flux-passing-surface shape is equal to arrangement pitches of the light-emitting elements.

Advantageously, the specific light-flux-passing-surface shape includes an circular arc represented by or approximated by a formula including the curvature radius R, and wherein a following formula is satisfied:

$$R0 \leq Ri$$

where $R0$ is a curvature radius of the specific light-flux-passing-surface shape in the cross-section in the sub-scanning-direction including the light-emitting elements, and $Ri$ is a curvature radius of the specific light-flux-passing-surface shape in any cross-section in the sub-scanning-direction excluding the light-emitting elements.

Advantageously, the specific light-flux-passing-surface shape includes a non-circular arc represented by or approximated by a formula including the curvature radius R, and wherein a following formula is satisfied:

$$R0 \leq Ri$$

where $R0$ is a curvature radius of the specific light-flux-passing-surface shape in the cross-section in the sub-scanning-direction including the light-emitting elements, and $Ri$ is a curvature radius of the specific light-flux-passing-surface shape in any cross-section in the sub-scanning-direction excluding the light-emitting elements.

Advantageously, wherein a point within the cross-section in the sub-scanning-direction of the lengthy lens, on which point parallel light irradiated from a direction perpendicular to the main-scanning direction onto the light output plane of the lengthy lens converges most, is a convergent point, and wherein a following formula is satisfied:

$$Bf0 \leq Bfi$$

where, $Bf0$ is a distance, within the cross-section in the sub-scanning-direction including the light-emitting elements, between the convergent point and the light incident plane of the lengthy lens, and $Bfi$ is a distance, within any cross-section in the sub-scanning-direction excluding the light-emitting elements, between the convergent point and the light incident plane of the lengthy lens.

Advantageously, the lengthy lens includes a plurality of lenses that are bonded together.

Advantageously, a length in which the light-emitting elements are aligned in the light-source unit is greater than the length of the illuminated area.

Advantageously, intervals of arrangement in which the light-emitting elements are arranged satisfy a following formula:

$$Pn-1 \geq Pn$$

where P0 is an interval between the adjacent light-emitting elements which are closest to the center of the light-source unit, and Pn (n is an integer equal to or more than one) is an interval between any adjacent light-emitting elements one of which is the closest to an end of the light-source unit.

Advantageously, the light-emitting elements each includes a one-chip type white light-emitting diode using a phosphor.

Advantageously, the light-emitting elements each includes a white light-emitting diode using two or more chips each of which emits light of a color different from any other colors emitted by other chips, and emitting white light by mixing the colors.

In addition, the invention provides an image reading apparatus, comprising an original-document illumination apparatus including: an illuminated area having a length and a width; a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

Moreover, the invention provides a color-original-document reading apparatus, comprising an original-document illumination apparatus including: an illuminated area having a length and a width; a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

Furthermore, the invention provides an image forming apparatus, comprising an image reading apparatus, the image reading apparatus including an original-document illumination apparatus having: an illuminated area having a length and a width; a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

Also, the invention provides an image forming apparatus, comprising a color-original-document reading apparatus, the color-original-document reading apparatus including an original-document illumination apparatus having: an illuminated area having a length and a width; a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION

Figure 1:
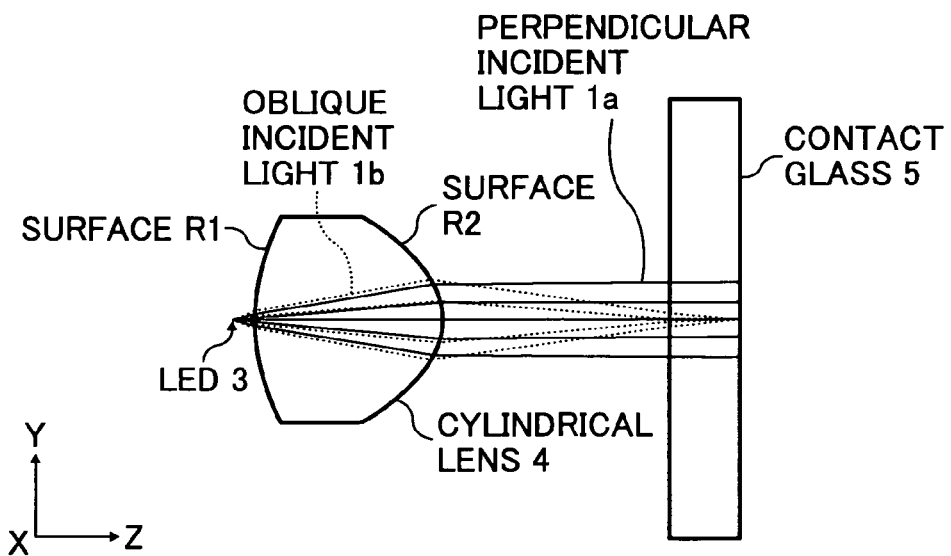
FIG. 1 illustrates a vertical cross section of an original-document illumination apparatus equipped with a cylindrical lens.

Reference will now be made in detail to the present preferred embodiments of the invention, examples of which are illustrated in the accompanying drawings. Wherever possible, the same reference numbers are used in the drawings and the description to refer to the same or like parts. It should be noted that the following embodiment is a preferred embodiment of the present invention, so that a variety of limitations that are technically preferable are included. The scope of the present invention, however, is not limited to these aspects of the embodiment unless the descriptions that follow are given with special remarks that these aspects do limit the present invention.

(Original-Document Illumination Apparatus)

Figure 5:
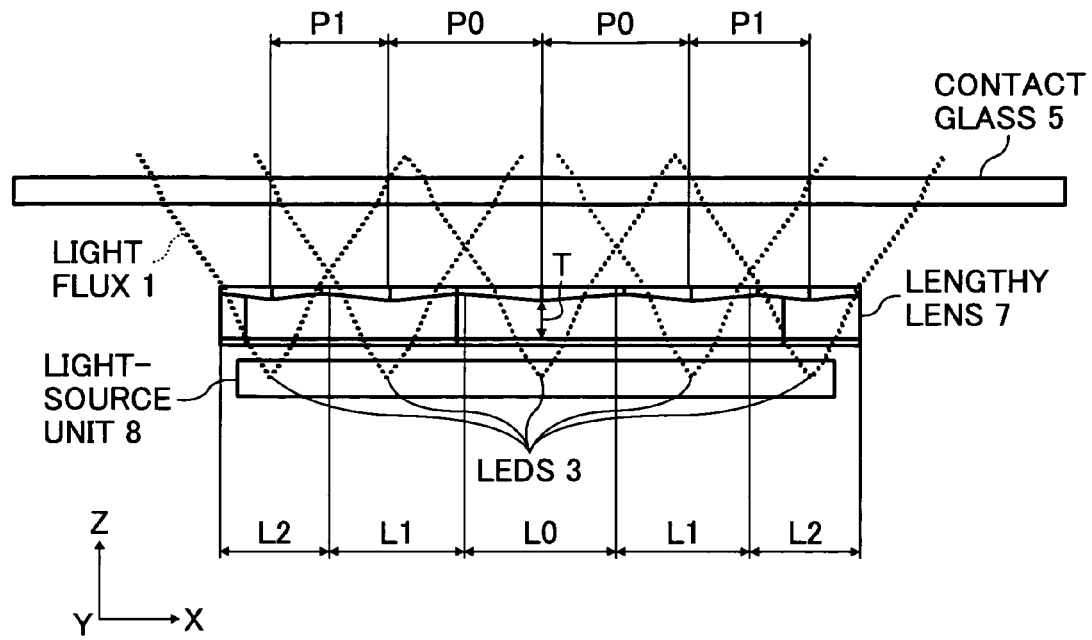
FIG. 5 illustrates a horizontal cross section of an original-document illumination apparatus according to an embodiment of the present invention.

FIG. 5 illustrates a horizontal cross section of the whole body of an original-document illumination apparatus according to the present embodiment.

The original-document illumination apparatus illustrated in FIG. 5 includes a light-source unit 8. In the light-source unit, a plurality of LEDs (point light sources), which are light-emitting elements, are aligned or installed in a row. Also included is a convergent lengthy lens 7, which refracts light flux 1 (hereinbelow, referred to also as light beam) emitted from the LED 3. In addition, the original-document illumination apparatus includes a contact glass 5 having an illuminated area. Of the two XY planes that the contact glass 5 has, the one that does not face the lengthy lens 7 is the illuminated area, which has a length and a width, and on top of which the original-document is placed. The light flux 1 emitted from the LED 3 passes through the contact glass 5, and then is irradiated onto the original-document on the illuminated area.

The lengthy lens 7 has a surface R1, from which the light comes in (i.e. light incident plane), and a surface R2, from which the light is going out (light output plane). The thickness of the central portion of the lengthy lens 7 is referred to as a thickness T. Here, z-direction in the drawing represents the direction of the optical axis of the lens 7; Y-direction, the sub-scanning direction; and x-direction, the main-scanning direction. The main-scanning direction is the direction in which the LEDs 3 are arranged, and is parallel to the sheet on which the drawing of FIG. 5 is described.

In this case, the shape of the light incident plane and/or the shape of the light output plane (the shape of specific light-flux-passing surfaces, i.e. a specific light-flux-passing-surface shape) within the corresponding cross section in the sub-scanning direction of the lengthy lens 7 (within the corresponding YZ-plane in the drawing) preferably vary cyclically in response to the position of the planes in the main-scanning direction (X-direction in the drawing). It is more preferable that the cycle of the variation of the shape (a cycle is defined as a distance between a position and another position next to the first mentioned one in the main-scanning direction X, at which positions the curvature radius of the lengthy lens 7 takes a minimum value) be equal to the pitch Pn (n is a positive integer, i.e. equal to or more than one) at which the LEDs 3 are arranged.

Hereinbelow, descriptions will be given using an example of the present embodiment based on the assumption that the light output plane, that is the surface R2, is made into the shape of specific light-flux-passing surface. This, however, does not at all limit the scope of the present invention in which the advantageous effects are obtained by making the surface R1 and/or the surface R2 into the shape of specific light-flux-passing surface.

Figure 6:
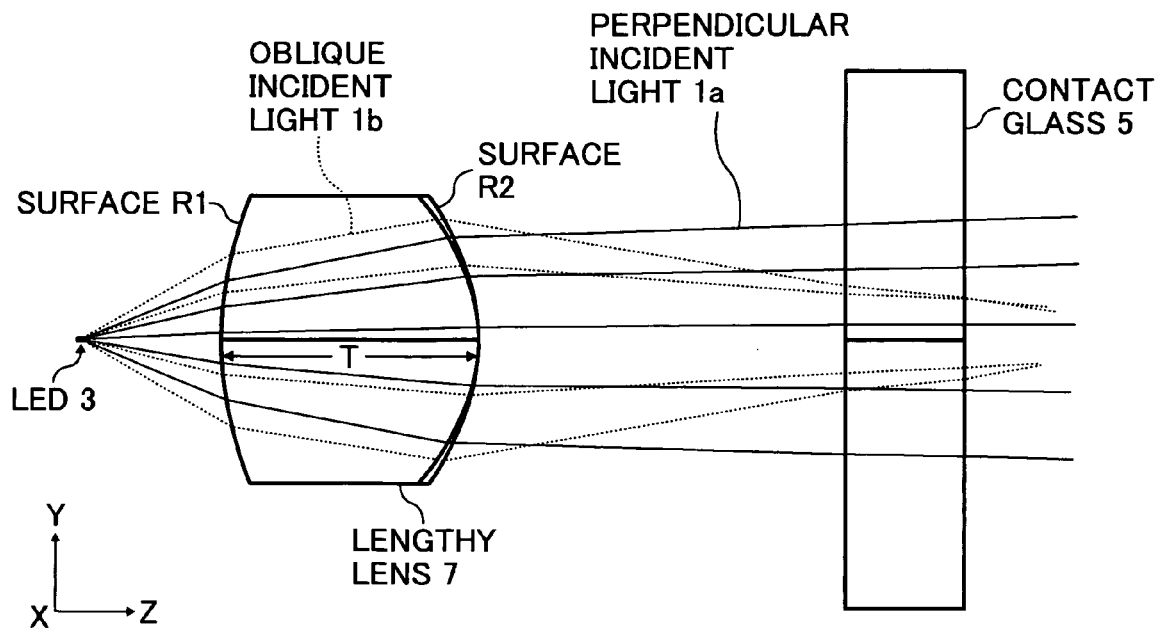
FIG. 6 illustrates a vertical cross section of the original-document illumination apparatus according to the embodiment of the present invention.
Figure 7:
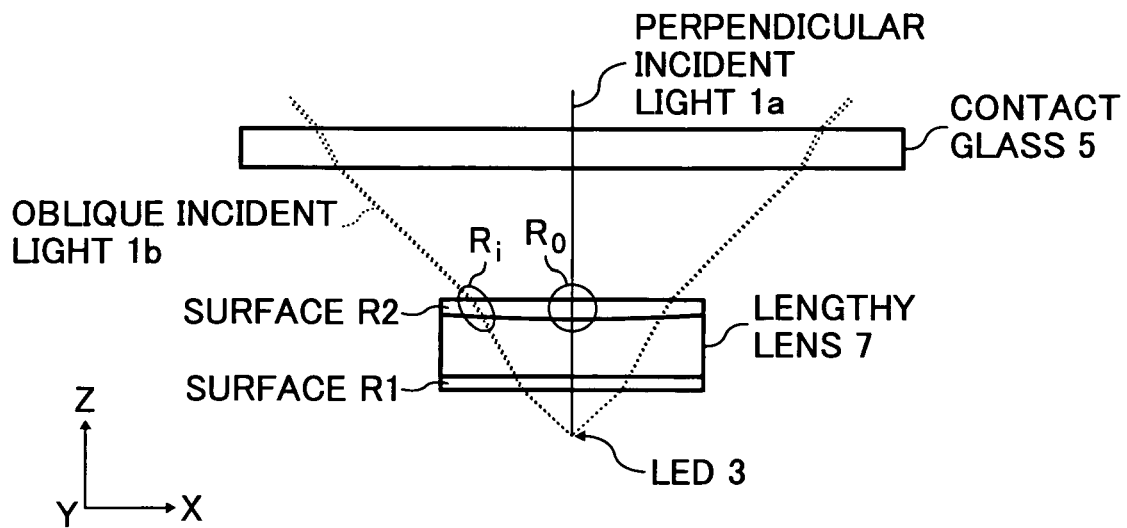
FIG. 7 illustrates a horizontal cross section of a part of the original-document illumination apparatus according to the embodiment of the present invention.

FIG. 6 illustrates a vertical cross section of the original-document illumination apparatus, and FIG. 7 illustrates a cross section of a part of the original-document illumination apparatus.

Here in a preferable shape of the light output plane, that is, of the surface R2, the curvature radius at the closest point to the LED 3 within the sub-scanning-direction cross-section is the smallest.

Specifically, in this embodiment, the shape of the light output plane, that is, the surface R2, is a circular arc, or non-circular arc, that is represented, or is approximated by a formula including the curvature radius R. Now, define R0 as curvature radius of the light output plane, that is, of the surface R2, within the sub-scanning-direction cross-section (YZ-plane in the drawing) including the corresponding LED 3, and Ri as the curvature radius of the light output plane, that is, of the surface R2, within any sub-scanning-direction cross-section that does not include the above-mentioned LED 3. In this case, a preferable relationship between R0 and Ri is:

$$R0 \leq Ri.$$

In addition, the shape of the light output plane, that is, of the surface R2, is possible to be represented by the following formula (1), which represents a free-form surface, with the coefficients Cn being determined appropriately so as to establish the following relationship:

$R0 \leq Ri$.

[Mathematical Expression 1]

$$Z = C_0 Y^2 + \sum_{m=1}^{n} C_m X^2 Y^{2m} \quad (1)$$
$$= C_0 Y^2 + C_1 X^2 Y^2 + C_2 X^2 Y^4 + C_3 X^2 Y^6 + ...$$

In the above formula, n is any natural number; Z, a coordinate in the direction of the optical axis of the lens; X, a coordinate in the main-scanning direction; and Y, a coordinate in the sub-scanning direction.

Consequently, in the original-document illumination apparatus illustrated in FIG. 6, the light flux which is emitted from the LED 3 (point light source) and which enters the light incident plane R1 of the lengthy lens 7, passes through the inside of the lens 7, then, exits from the light output plane R2, and, eventually, reaches the contact glass 5. In this event, the light beams 1a (illustrated by the solid lines) that perpendicularly enter the lengthy lens 7 are refracted by the lengthy lens 7, and reach, as parallel light beams, the contact glass 5. Meanwhile, the light beams 1b (illustrated by the dotted lines) that obliquely enter the lengthy lens 7 are refracted by the lengthy lens 7, and reach, as convergent light beams, the contact glass 5.

Now, regarding the lengthy lens 7 of this embodiment of the present invention, define Bf0 and Bfi as follows. Firstly, suppose that parallel light beams are irradiated onto the light output plane from a direction perpendicular to the main-scanning direction. Then, a convergent point is defined as the point at which the light beams are converged most within the corresponding sub-scanning-direction cross-section of the lengthy lens 7. Now, Bf0 is defined as the distance between the convergent point within the sub-scanning-direction cross-section including the corresponding LED 3 and the light incident plane of the lengthy lens 7. Meanwhile, Bfi is defined as the distance between the convergent point within any sub-scanning-direction cross-section that does not include the above-mentioned LED 3 and the light incident plane of the lengthy lens 7. A preferable relationship to be established between Bf0 and Bfi thus defined is: $Bf0 \leq Bfi$.

Figure 8:
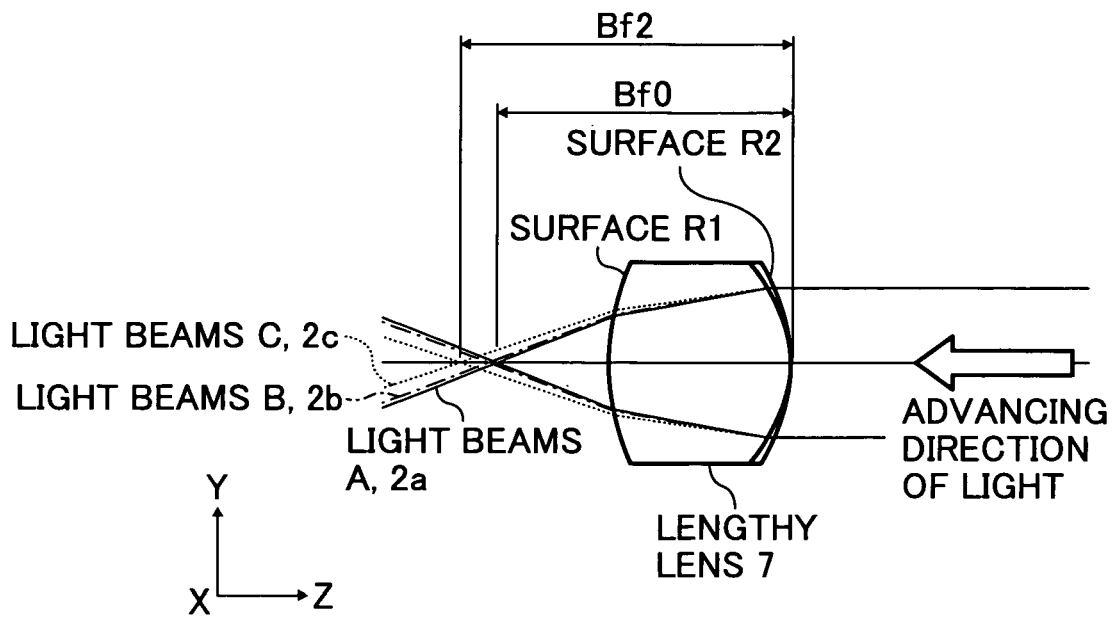
FIG. 8 illustrates a vertical cross section of the original-document illumination apparatus according to the embodiment of the present invention, illustrating a state where parallel light beams enter a lengthy lens of the original-document illumination apparatus from the side of R2 surface of the lens.
Figure 9:
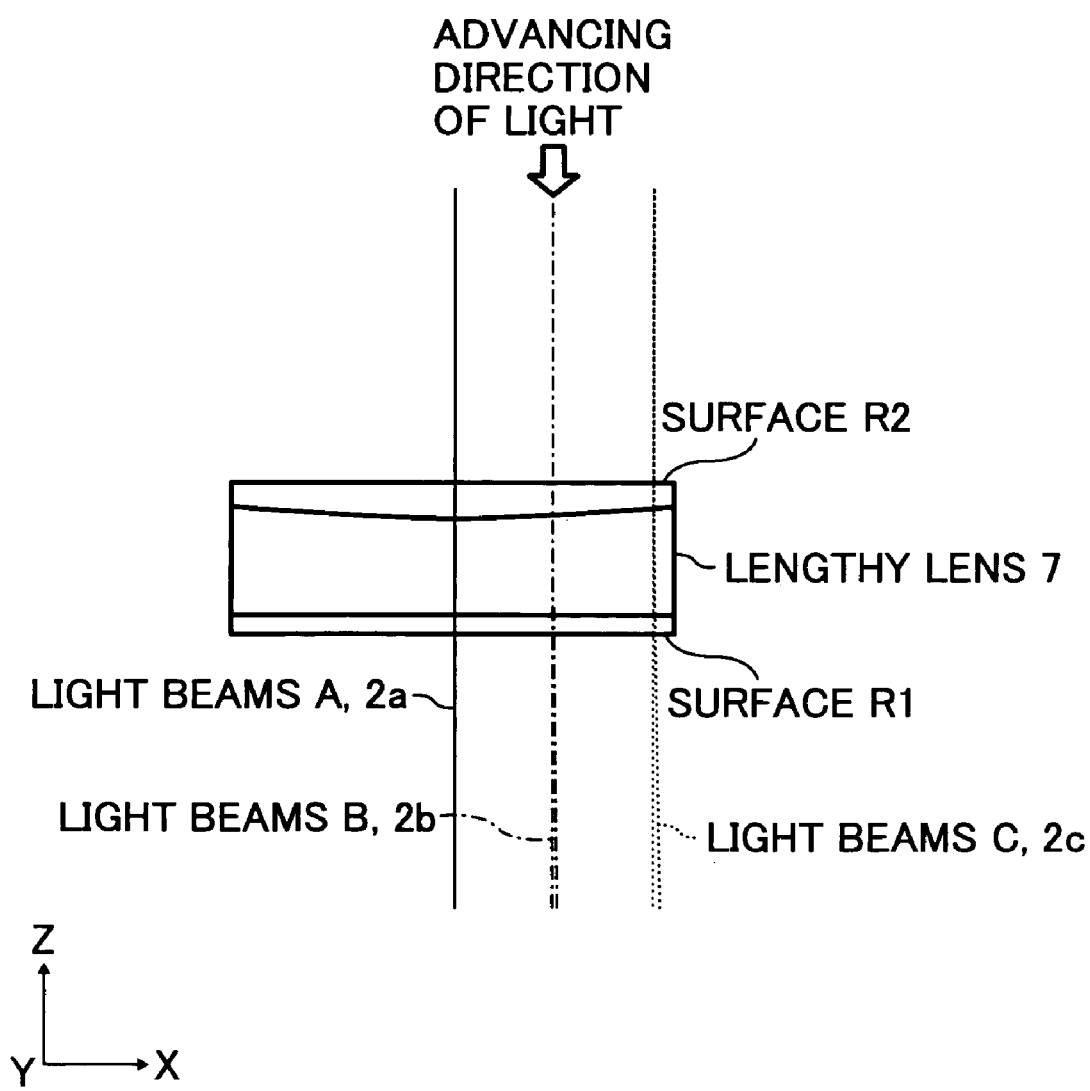
FIG. 9 illustrates a horizontal cross section of a part of the original-document illumination apparatus according to the embodiment of the present invention, illustrating a state where parallel light beams enter a lengthy lens of the original-document illumination apparatus from the side of R2 surface of the lens.

FIGS. 8 and 9 illustrate the trajectory of light beams. The light beams in consideration here are parallel light beams that are irradiated from a direction perpendicular to the main-scanning direction onto the light output plane R2 of the lengthy lens 7 of this embodiment of the present invention. FIG. 8 illustrates a vertical cross section of the original-document illumination apparatus according to this embodiment of the present invention, and FIG. 9 illustrates a horizontal cross section of a part of the original-document illumination apparatus according to this embodiment of the present invention. Here, regarding the convergent point of parallel beams that are irradiated, the relationship $Bf0 \leq Bfi$ is established.

The lengthy lens 7 is made of transparent plastic or glass. The lens 7 may be formed by bonding processing. Alternatively, the lens 7 may be formed by casting to eliminate the bonding surface. A lens 7 formed by bonding processing is preferable because of its superior manufacturability.

In addition, as FIG. 5 illustrates, to irradiate the light onto the entire illuminated area, the length of the row in which the LEDs 3 are installed is preferably longer than the length of the illuminated area.

Moreover, now, regarding the pitch between two adjacent ones of the LEDs thus installed in a row, P0 and Pn (n is a positive integer) are defined as follows. P0 is the distance between the two LEDs closest to the center of the light-source unit. Meanwhile Pn is the distance between any adjacent two LEDs including the LED closest to the end portion of the light-source unit. A preferable relationship to be established is:

$Pn-1 \geq Pn$.

For example, in the example illustrated in FIG. 5, the relationship $P0 \geq P1$ is established.

Each of the LEDs may include a one-chip type white light-emitting diode utilizing a phosphor. Alternatively, each of the LEDs may include a white light-emitting diode using two or more chips each of which emits light of a color different from any other colors emitted by other chips, and emitting white light by mixing the colors.

(Image Reading Apparatus, Image Forming Apparatus)

Figure 10:
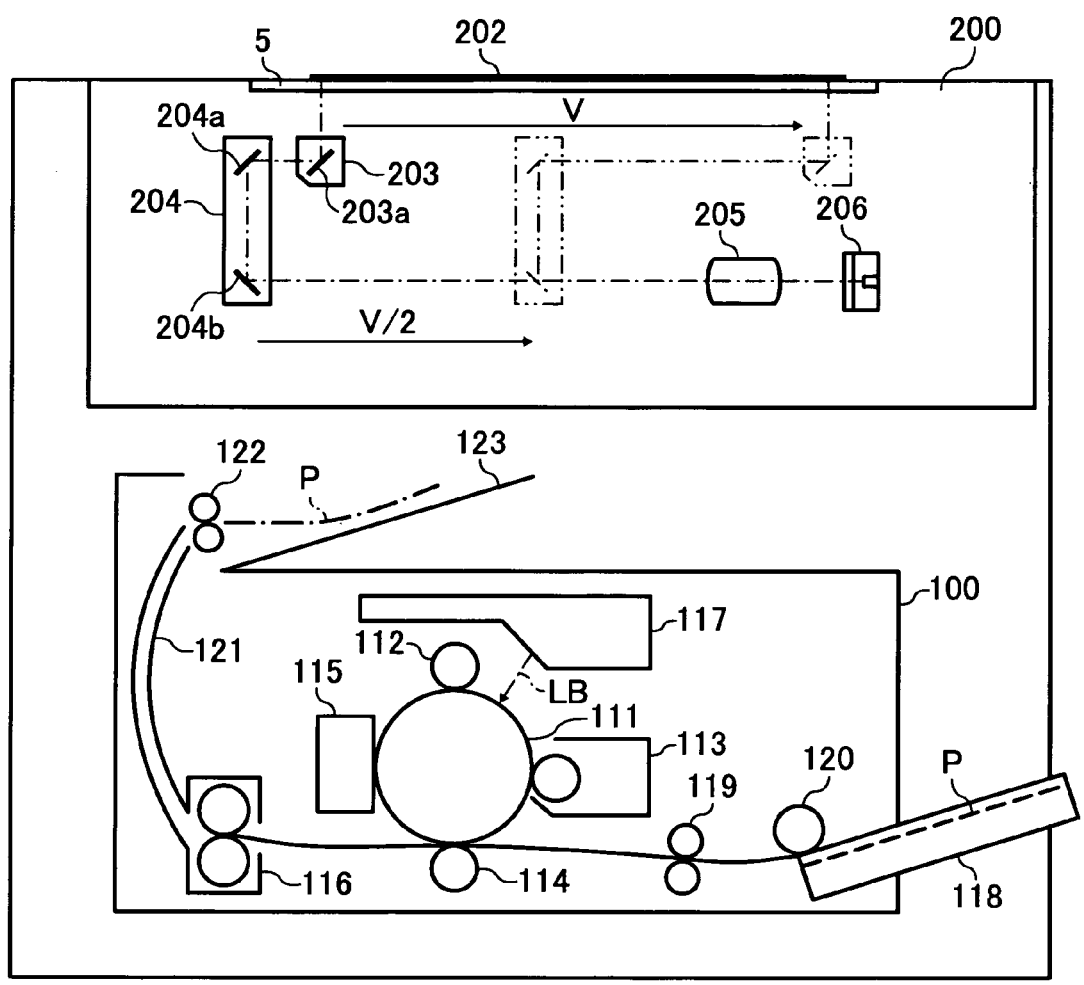
FIG. 10 illustrates a schematic view of an image forming apparatus according to an embodiment of the present invention.

FIG. 10 illustrates schematically an image forming apparatus equipped with an image reading apparatus.

In FIG. 10, an image forming apparatus is denoted by 100, and an image reading apparatus is denoted by 200. Other reference numerals for components are cited directly in the description.

In the image reading apparatus 200, an original-document 202 is placed on the contact glass 5. Placed below the contact glass 5 is a first carrier 203. The lengthy lens 7 and the light-source unit 8 according to this embodiment of the present invention are installed (though not illustrated) in the first carrier 203. The original-document 202 are illuminated by irradiating, from the below of the contact glass 5, the light beams 1 emitted from the light-source unit 8. The light reflected from the original-document 202, is further reflected by a first mirror 203a of the first carrier 203, and then by a first and a second mirrors 204a and 204b of a second carrier 204. The light thus reflected is guided to a contracting image-forming lens 205, and thus an image is formed on the line sensor 206. Note that, the embodiment of the present invention is applicable to the case of a color-original-document reading apparatus with the same configuration as that described above, only by providing three of the line sensors 206, each of which corresponds to each one of the three RGB colors.

Now, suppose the reading is carried out in the longitudinal direction of the original-document. In this case, the first carrier 203 equipped with the lengthy lens 7 and the LEDs 3 is moved towards the right of the drawing at a speed V, and, concurrently, the second carrier 204 is moved towards the right at a speed ½V, which is half a speed of that of the first carrier 203. Thus, the length of the light path from the original-document 202 to the line sensor 206 is kept constant, so that the entire original-document is readable at a constant magnification ratio.

A common way of using LEDs as an original-document illumination apparatus used in an image reading apparatus is arranging many LEDs in an array.

The image forming apparatus 100, which utilizes the image reading apparatus 200 or the color-original-document reading apparatus, includes a drum-shaped latent-image carrier 111. Also included in the image forming apparatus 100 are a charge roller 112 as charging means, a development apparatus 113, a transfer roller 114, and a cleaning apparatus 115, all of which are placed around the latent-image carrier 111. A "corona charger" is also possible to serve as the charging means. In addition, an optical scanning apparatus 117 is provided. The optical scanning apparatus 117 carries out an optical scanning operation with laser beams LB in response to information on an original-document sent from the outside, for example, from an image reading unit. With this optical scanning apparatus 117, an "exposure by optical writing" is carried out between the charge roller 112 and the development apparatus 113.

When image-forming is carried out, the latent-image carrier 111, which is a photoconductive photoreceptor, is rotated clockwise at a constant speed. The surface of the latent-image carrier 111 is uniformly charged by the charge roller 112, and then is subjected to an exposure by optical writing with the laser beams LB emitted from the optical scanning apparatus 117. An electrostatic latent image is formed in this way. There are two types of electrostatic latent images that are formed in the above-described way: what is termed as a negative latent image in which the image portion is exposed; and what is termed as a positive latent image in which non-image portion is exposed. The visualization for both types of latent images is carried out by the development apparatus 113 with a toner for development of electrostatic latent images. When four of the development apparatuses 113 are provided for respective colors of YMCK, the image forming apparatus is capable of forming color images.

A cassette 118, which is detachably attached to the main body of the image forming apparatus 100, is provided to store transfer paper P. In a state where the cassette 118 is attached to the image forming apparatus 100 as illustrated in FIG. 10, the top most sheet of the stored transfer paper P is fed by a paper-feed roller 120, and a pair of registration rollers hold the front end portion of the transfer paper P thus fed. The pair of registration rollers 119 send the transfer paper P to a transfer unit just in time for the movement of the toner image on the latent-image carrier 111 at the position where the transfer is actually carried out. The toner image is laid on the transfer paper P sent in the transfer unit, and is electrostatically transferred to the transfer paper P by an operation of the transfer roller 114. The transfer paper P with the toner image being transferred thereon is sent to a fixation apparatus 116, and, in the fixation apparatus 116, the toner image is fixed on the transfer paper P. The resultant transfer paper P, then, passes through a transportation path 121, and, eventually, is discharged to a tray 123 by a pair of discharge rollers 122. After the toner image is transferred to the transfer paper P, the surface of the latent-image carrier 111 is cleaned by the cleaning apparatus 115 to remove residual toner and paper dusts.

Now, further detail descriptions will be given below of the original-document illumination apparatus, the image reading apparatus, the color-original-document reading apparatus, and the image forming apparatus according to examples of the present embodiment of the invention.

EXAMPLES

Example 1

In the Example 1, the state of convergence of the light flux was examined with the configuration illustrated in FIGS. 6 and 7 under the following conditions.

(Lengthy Lens)

Thickness at the center: 7 (mm)

Width in the main-scanning direction: 20 (mm)

Material: nd (refractive index)=1.491, νd (Abbe number)=57.2

Surface R1: cylindrical surface with a 10-mm curvature radius

Surface R2: a free-form surface represented by the formula (1) where C0=0.1, and C1=−0.0003.

[Mathematical Expression 2]

$$Z = C_0 Y^2 + \sum_{m=1}^{n} C_m X^2 Y^{2m} \qquad (1)$$
$$= C_0 Y^2 + C_1 X^2 Y^2 + C_2 X^2 Y^4 + C_3 X^2 Y^6 + \ldots$$

In the above formula (1), n is any natural number; Z, a coordinate in the direction of the optical axis of the lens; X, a coordinate in the main-scanning direction; and Y, a coordinate in the sub-scanning direction.

(LED)

Number of LEDs: 1

Luminous intensity distribution: uniform distribution (Contact Glass)

Thickness at the center: 3.2 (mm)

Material: nd=1.517, νd=64.2

(Relationship Between LED and the Surface R1 of the Lens)

Distance: 3.8 (mm)

(Area of the Original-Document)

Position: on the surface of the contact glass

Size: 51 (mm)×5 (mm) ((main-scanning direction)×(sub-scanning direction))

(Conditions for Simulation)

Number of light beams: 3 million

Spectral distribution of the light beams: from 435.83 (nm) to 656.27 (nm)

In general, the LED 3 and the lengthy lens 7 are installed obliquely to the contact glass 5 so as to secure a passage for the light from the original-document to the reading lens. In this Example, however, the LED 3 and the lengthy lens 7 are installed in parallel to the contact glass 5. This is because the main purpose of this Example is to show the change in parallelism of the light which is emitted from the LED 3 and which enters the lengthy lens 7. In addition, the above-mentioned way of installation makes the drawings more understandable. Nevertheless, according to the embodiment of the present invention, the lengthy lens 7 may be installed so as to make an oblique angle to the contact lens 5. Rather, the oblique installation is more preferable.

Consequently, as FIGS. 6 and 7 illustrate, the surface R2 of the lengthy lens 7 has a surface form in which the curvature is gradually decreased as the position of the sub-scanning-direction cross-section taken for obtaining the curvature moves, in the main-scanning direction, from the position of the sub-scanning-direction cross-section including the LED 3.

FIGS. 8 and 9 illustrate the above-mentioned form of the lengthy lens 7. FIGS. 8 and 9 illustrate the following fact regarding the parallel incident light entered from the surface R2 side. Because of the above-described form of the surface R2, the convergent point for light beams (B) 2b represented by dashed-dotted lines is farther from the lens than the convergent point for light beams (A) 2a represented by solid lines is. In addition, the convergent point for light beams (C) 2c represented by dotted lines is farther from the lens than the convergent point for light beams (B) 2b represented by dashed-dotted lines is.

Use of the lengthy lens 7 with a surface form as described above has the following effect on the oblique incident light 1b emitted so as to make an oblique angle to the sub-scanning-direction cross-section including the LED 3. The effect is that the use of the lens 7 allows the light 1b to enter the contact glass 5 with weaker convergence than in the case of using a cylindrical lens 4 as illustrated in FIGS. 1 and 6. As a result, a substantially even illumination intensity distribution on the area of the original-document is accomplished in the main-scanning direction. In addition, an even illumination intensity distribution is also accomplished in the sub-scanning direction within the range of the beam width.

To show the above-mentioned fact, the illumination intensity distribution is obtained by a ray-trace simulation. In this event, 3 million light beams are emitted from the LED 3, allowed to pass through the lengthy lens 7, and then illuminate the area (51 mm×5 mm) of the original-document placed on the contact glass 5. It should be noted that though the inherent luminous intensity distribution of LEDs is Lambert's distribution, the simulation is carried out by assuming a uniform distribution (i.e., equal luminous intensity in all directions) for the luminous intensity distribution of the LED. By eliminating the influence of the Lambert's luminous intensity distribution on the illumination intensity distribution on the area of the original-document, the superiority of the lengthy lens 7 to the cylindrical lens 4 described later in Comparative Example 1 becomes more recognizable.

Figure 4:
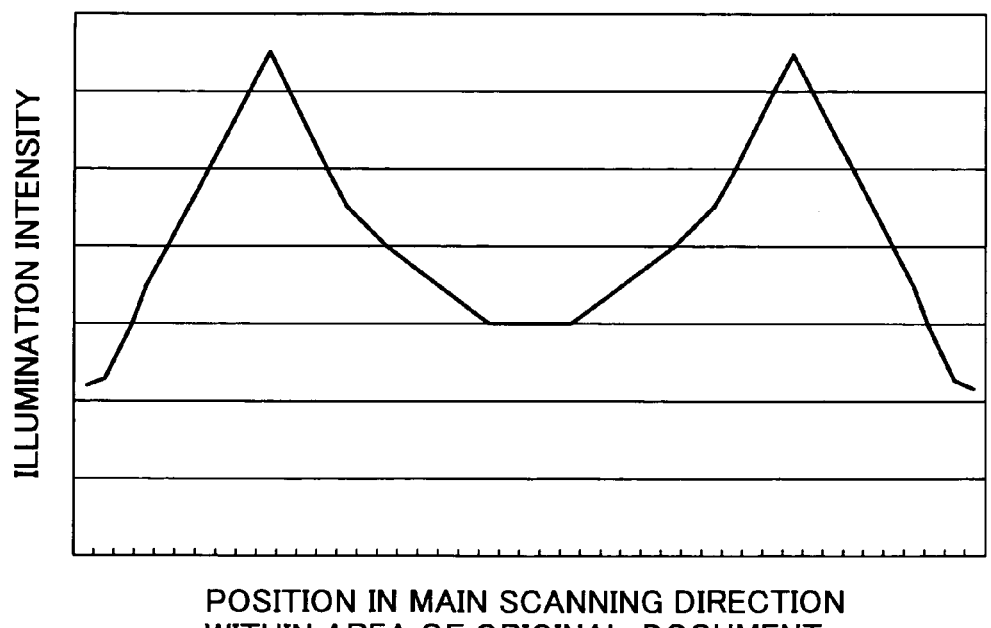
FIG. 4 represents illumination intensity distribution in the main scanning direction of the original-document illumination apparatus using the cylindrical lens.
Figure 11:
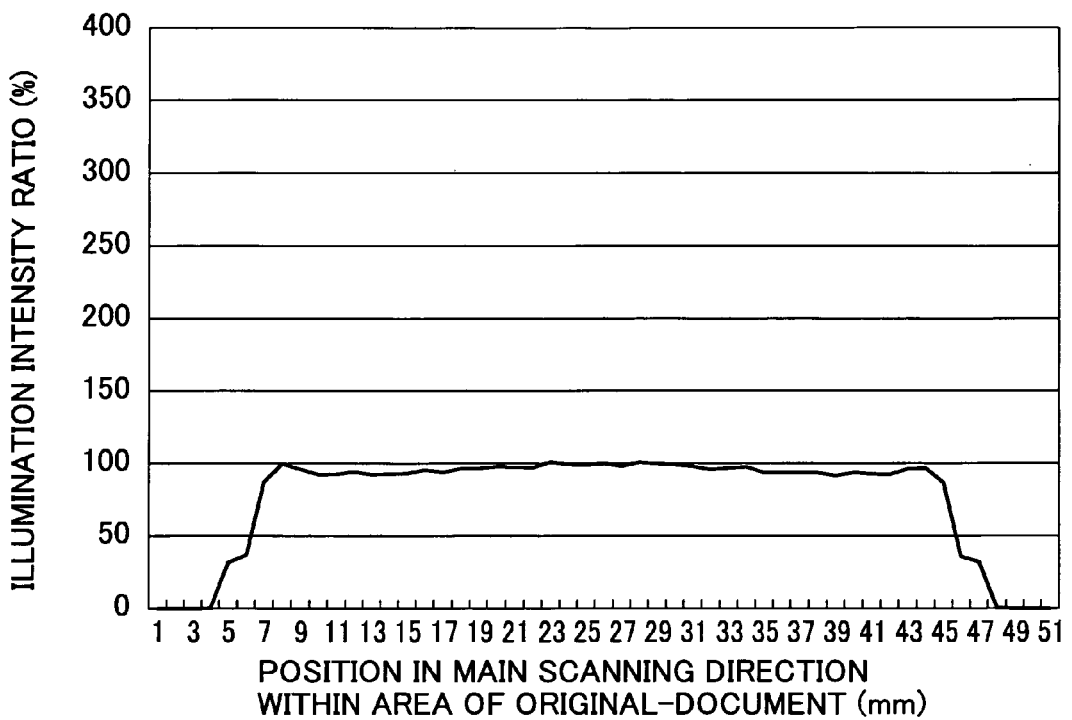
FIG. 11 represents the illumination intensity distribution in the main-scanning direction of an original-document illumination apparatus according to example 1.

FIG. 11 represents the illumination intensity distribution on the area of the original-document in the main-scanning direction. The illumination intensity distribution is obtained by plotting the intensities at positions which are, by 5 mm, away from the corresponding center positions in the sub-scanning direction. Use of the lengthy lens 7 of this Example, helps accomplish a highly uniform illumination intensity distribution over approximately 40-mm area, unlike the case represented in FIG. 4, in which case, a rise in illumination intensity is observed at each of the end portions of the area.

Comparative Example 1

The purpose of Comparative Example 1 is to represent the superiority of the lengthy lens 7 of Example 1 to the cylindrical lens 4 of Comparative Example 1. The configuration of Comparative Example 1 is the same as that illustrated in the vertical cross sectional view of FIG. 1 and in the horizontal cross sectional view of FIG. 2, and is the same as that of Example 1, except for the lens.

Figure 2:
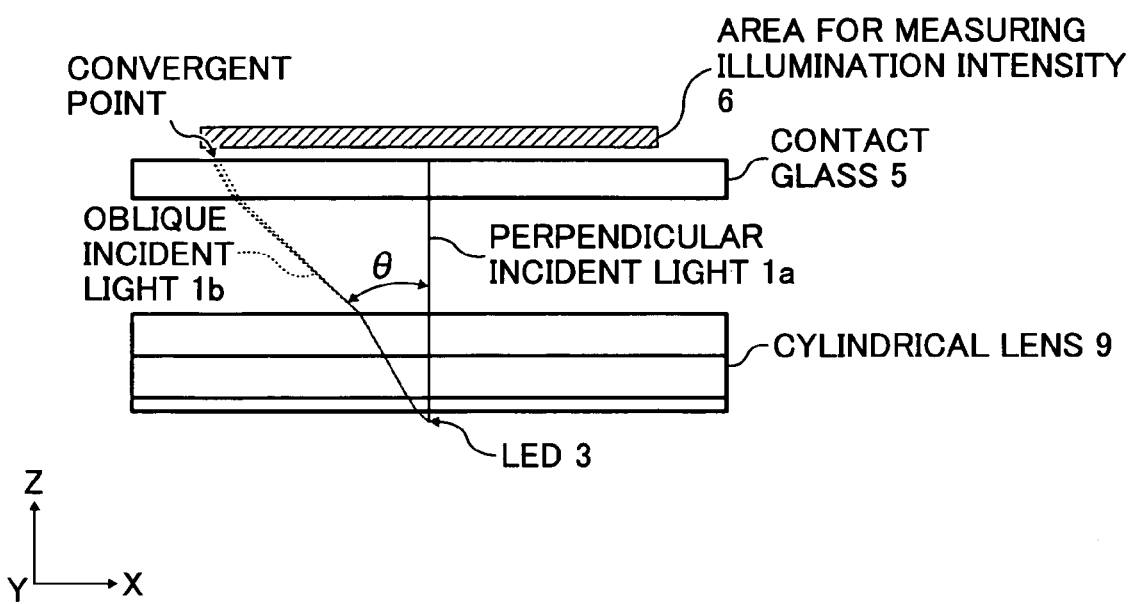
FIG. 2 illustrates a horizontal cross section of the original-document illumination apparatus equipped with the cylindrical lens.
Figure 3:
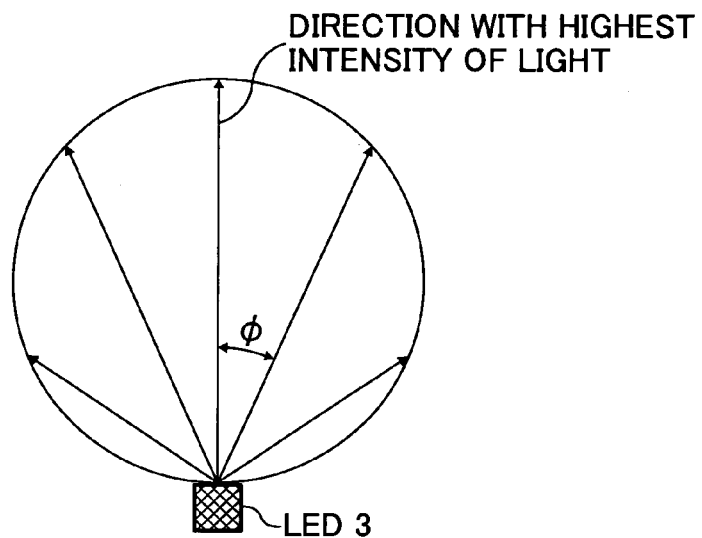
FIG. 3 illustrates basic concept of the luminous intensity distribution of an LED.

In this Comparative Example 1, the state of light-beam convergence is examined with the same configuration as illustrated in FIGS. 1 and 2 and under the following conditions.

(Lengthy Lens)

Thickness at the center: 7 (mm)

Width in the main-scanning direction: 20 (mm)

Material: nd=1.491, νd=57.2

Surface R1: cylindrical surface with a 10-mm curvature radius

Surface R2: cylindrical surface represented by the formula (2) below with C0=0.1

[Mathematical Expression 3]

$$Z=C_0Y^2 \tag{2}$$

In the above formula (2), Z is a coordinate in the direction of the optical axis of the lens; and Y, a coordinate in the sub-scanning direction.

(LED)

Number of LEDs: 1

Luminous intensity distribution: uniform distribution (Contact Glass)

Thickness at the center: 3.2 (mm)

Material: nd=1.517, νd=64.2

(Relationship Between LED and the Surface R1 of the Lens)

Distance: 3.8 (mm)

(Area of the Original-Document)

Position: on the surface of the contact glass

Size: 51 (mm)×5 (mm) ((main-scanning direction)×(sub-scanning direction))

(Conditions for Simulation)

Number of light beams: 3 million

Spectral distribution of the light beams: from 435.83 (nm) to 656.27 (nm)

Figure 12:
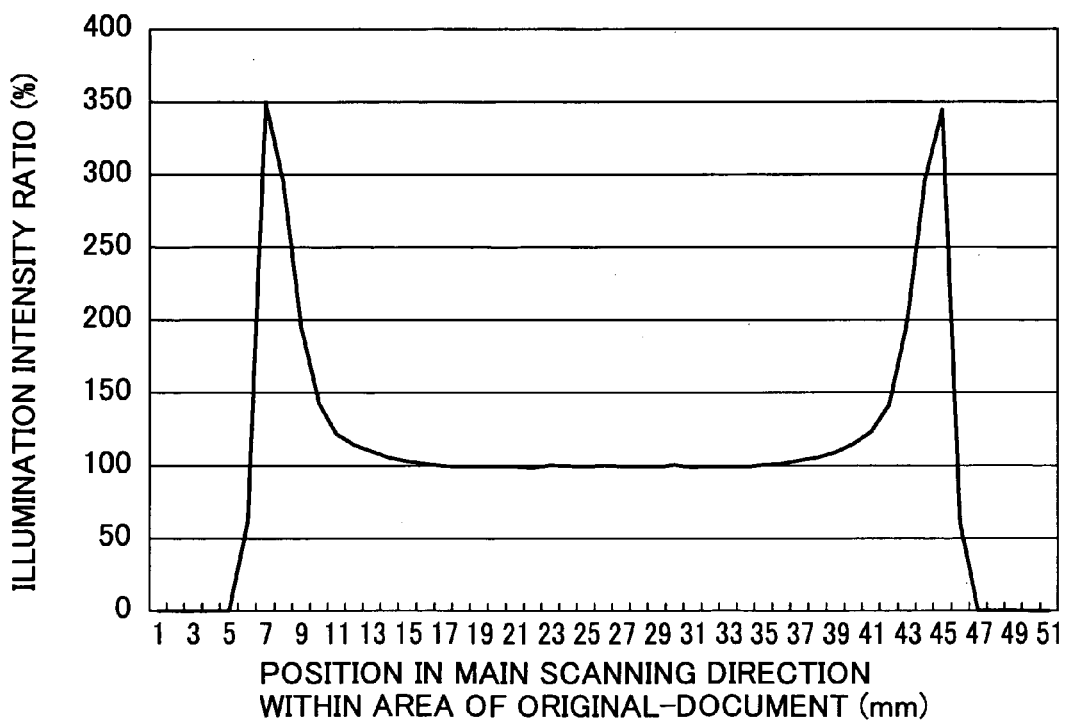
FIG. 12 represents the illumination intensity distribution in the main-scanning direction of the original-document illumination apparatus equipped with a cylindrical lens according to a comparative example 1.

FIG. 12 represents the result of the ray-trace simulation carried out, as in the case of Example 1, on the illumination intensity distribution on the area of the original-document. FIG. 12 clearly represents an occurrence of an extremely uneven distribution with a strong-intensity area at each end portion of the illuminated area. Placement of many LEDs could not eliminate the strong-intensity areas at both end portions. Because of the remaining strong-intensity areas, the configuration of the Comparative Example 1 is not applicable to an illumination apparatus.

The luminous intensity distribution of the LED used in Example 1 and Comparative Example 1 is uniform distribution because the purpose of these examples is describing the advantageous effects of the lengthy lens 7 of the embodiment of the present invention. The lengthy lens 7 of the embodiment of the present invention, however, is also possible to deal with even an LED with non-uniform luminous intensity distribution.

In a case where the luminous intensity distribution of the LED is expected to bring about an uneven distribution of light quantity on the area of the original-document, the unevenness in the light quantity distribution in the main-scanning direction is possible to be dealt with by adjusting the degree of decreasing the curvature of the lens, and the light quantity distribution in the sub-scanning direction is possible to be sufficiently dealt with by changing the curvature itself of the lens, or by changing the distance between the LED and the lens.

Example 2

The Example 2 represents a case of using a plurality of LEDs.

Figure 13:
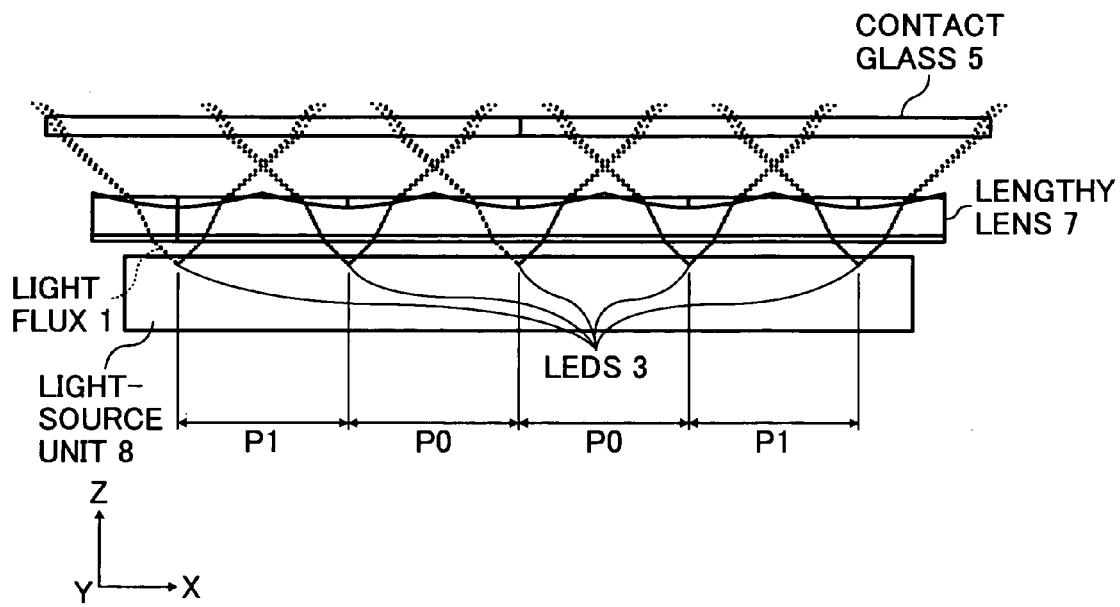
FIG. 13 illustrates a horizontal cross section of an original-document illumination apparatus according to example 2.

FIG. 13 illustrates a horizontal cross section of an original-document illumination apparatus of Example 2. A lengthy lens 7 of Example 2 is formed by joining together five of the lengthy lenses 7 described in the specifications of Example 1 and of Comparative Example 1. Linking together the lengthy lenses 7 of the original-document illumination apparatus capable of illuminating any arbitrarily-determined area and appropriate arrangement of the LEDs 3 help accomplish uniform illumination to a wider area in the main-scanning direction. In addition, though the luminous intensity distribution of each LED 3 is Lambert's distribution, an even distribution of illumination intensity is possible to be accomplished by an appropriate adjustment between LEDs.

Hereinbelow, the state of light-beam convergence is examined with a configuration as illustrated in FIG. 13 and under the following conditions.

(Lengthy Lens)

Thickness at the center: 7 (mm)

Width in the main-scanning direction: 135 (mm)

Material: nd=1.491, vd=57.2

Surface R1: cylindrical surface with a 10-mm curvature radius

Surface R2: free-form surface represented by formula (1) with C0=0.1, C1=−0.0009

[Mathematical Expression 4]

$$Z = C_0 Y^2 + \sum_{m=1}^{n} C_m X^2 Y^{2m} \qquad (1)$$
$$= C_0 Y^2 + C_1 X^2 Y^2 + C_2 X^2 Y^4 + C_3 X^2 Y^6 + \ldots$$

In the above formula (1), n is any natural number; Z, a coordinate in the direction of the optical axis of the lens; X, a coordinate in the main-scanning direction; and Y, a coordinate in the sub-scanning direction.

(LED)

Number of LEDs: 5

Pitch: 27 (mm)

Luminous intensity distribution: Lambert's distribution (Contact Glass)

Thickness at the center: 3.2 (mm)

Material: nd=1.517, vd=64.2

(Relationship Between LED and the Surface R1 of the Lens)

Distance: 3.8 (mm)

(Area of the Original-Document)

Position: on the surface of the contact glass

Size: 51 (mm)×5 (mm) ((main-scanning direction)×(sub-scanning direction))

(Conditions for Simulation)

Number of light beams: 3 million

Spectral distribution of the light beams: from 435.83 (nm) to 656.2.7 (nm)

Figure 14:
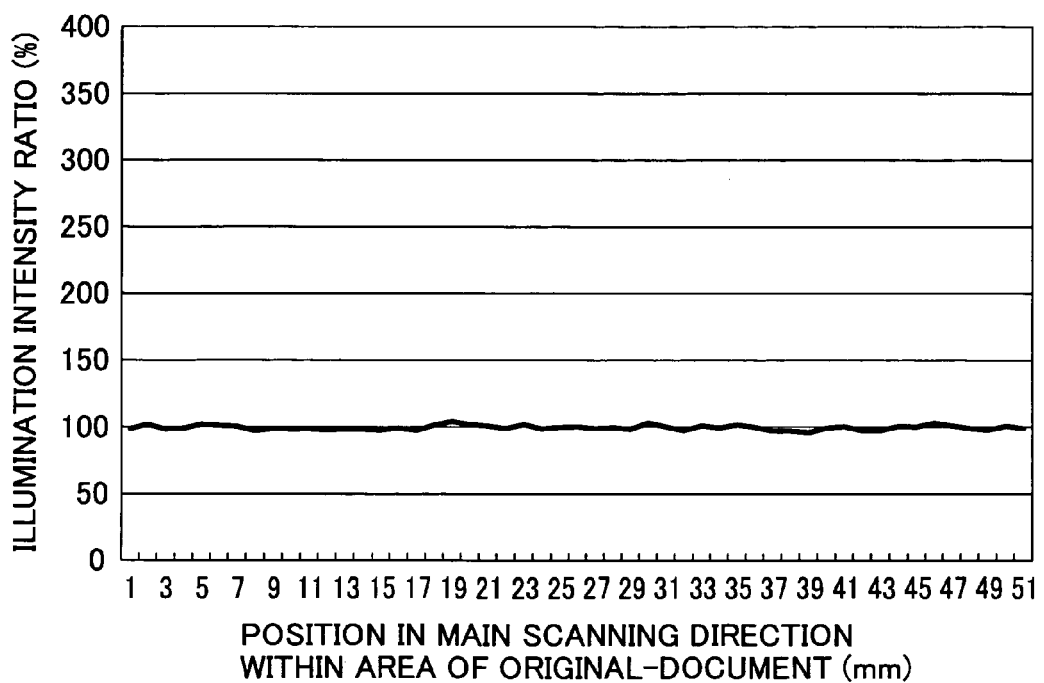
FIG. 14 represents the illumination intensity distribution in the main-scanning direction of an original-document illumination apparatus according to the example 2.
Figure 15:
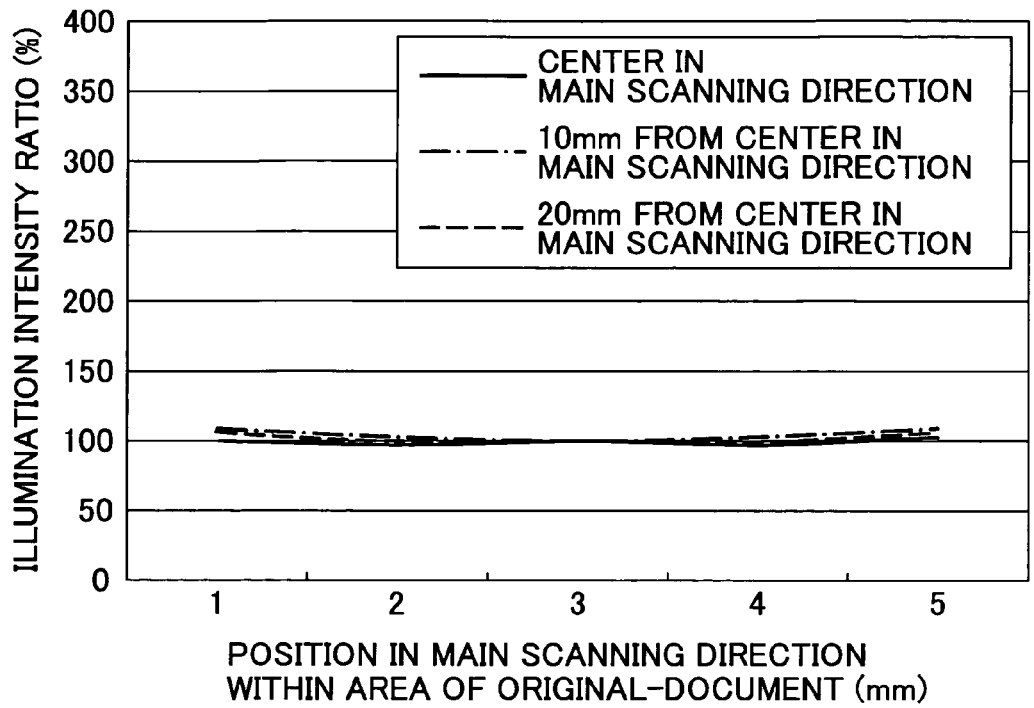
FIG. 15 represents the illumination intensity distribution in the sub-scanning direction of an original-document illumination apparatus according to the example 2.

FIG. 14 represents the illumination intensity distribution on the area of the original-document, which distribution is obtained by carrying out a ray-trace simulation as in the cases of Example 1 and of Comparative Example 1. A uniform illumination intensity distribution in the main-scanning direction is observed within the area of the original-document in FIG. 14. Meanwhile, FIG. 15 represents the illumination intensity distribution in the sub-scanning direction Y. Solid lines are the distribution of illumination intensity in the sub-scanning direction Y obtained by plotting the intensities at the center positions, in the main-scanning direction X, of the area of the original-document. Dashed-dotted lines are the distribution obtained by plotting the intensities at positions which are, by 10 mm, away from the corresponding center positions in the main-scanning direction. Dotted lines are obtained by plotting the intensities at positions which are, by 20 mm, away from the corresponding centers. FIG. 15 clearly represents that, in Example 2, a highly uniform distribution of illumination intensity on the area of the original-document is accomplished both in the main-scanning direction X and in the sub-scanning direction Y. The illumination intensity distribution is uniform enough for the configuration of Example 2 to be used in an image reading apparatus.

Example 3

FIG. 5 illustrates a horizontal cross section of an original-document illumination apparatus of Example 3. The pitch with which LEDs 3 are arranged is gradually made narrower from the center to the periphery in the main-scanning direction. While the curvature of each of the lenses within the lengthy lens 7 is cyclically decreased, the cycle of the decrease is made shorter in accordance with the narrowing pitch. As a result, a drop in the quantity of light on the area of the original-document in the two end portions in the main-scanning direction is possible to be made smaller.

Arranging LEDs 3 at an equal pitch inevitably brings about a drop in the quantity of light on the area of the original-document in the two end portions unless other members are added to the original-document illumination apparatus or unless some special arrangements, such as a reflector provided on the end portions of the lengthy lens 7, are made. In general, in most of the illumination apparatus of line light type such as the one used in this Example, only the areas where the quantity of light is uniform is used while the areas of the end portions where a light quantity drop occurs are not used. However, the original-document illumination apparatus sometimes needs to be made compact. In this case, the original-document illumination apparatus with variable pitch for the array of the LEDs 3, such as one described above, is possible to uniformly illuminate a wider area in the main-scanning direction than an original-document illumination apparatus of equal size with LEDs 3 being arranged at an equal pitch.

In this Example, the state of light-beam convergence is examined with a configuration as illustrated in FIG. 5 and under the following conditions.

(Lengthy Lens)

Thickness at the center: 7 (mm)

Width in the main-scanning direction: 128 (mm)

Configuration of the lengthy lens: L0=28 (mm), L1=26 (mm), L2=24 (mm)

L0: the distance between two points in each of which the curvature radius is a local maximum and which are closest to the center of the lens in the main-scanning direction;

L1: the distance between two points of local maximum curvature radius for a section next to the section corresponding to L0; and L2: the distance between two points of local maximum curvature radius for a section next to the section corresponding to L1.

Material: nd=1.491, vd=57.2

Surface R1: cylindrical surface with a 10-mm curvature radius

Surface R2: free-form surface represented by formula (1) with C0=0.1, C1=−0.0009

[Mathematical Expression 5]

$$Z = C_0 Y^2 + \sum_{m=1}^{n} C_m X^2 Y^{2m} \quad (1)$$
$$= C_0 Y^2 + C_1 X^2 Y^2 + C_2 X^2 Y^4 + C_3 X^2 Y^6 + \ldots$$

In the above formula (1), n is any natural number; Z, a coordinate in the direction of the optical axis of the lens; X, a coordinate in the main-scanning direction; and Y, a coordinate in the sub-scanning direction.

(LED)

Number of LEDs: 5

Pitch: Distance between the LED at the center and the adjacent LED 27 (mm)

Distance between the LED adjacent to the center LED and the next LED 25 (mm)

(Contact Glass)

Thickness at the center: 3.2 (mm)

Material: nd=1.517, μd=64.2

(Relationship Between LED and the Surface R1 of the Lens)

Distance: 3.8 (mm)

(Area of the Original-Document)

Position: on the surface of the contact glass

Size: 51 (mm)×5 (mm) ((main-scanning direction)×(sub-scanning direction))

(Conditions for Simulation)

Number of light beams: 3 million

Spectral distribution of the light beams: from 435.83 (nm) to 656.27 (nm)

Figure 16:
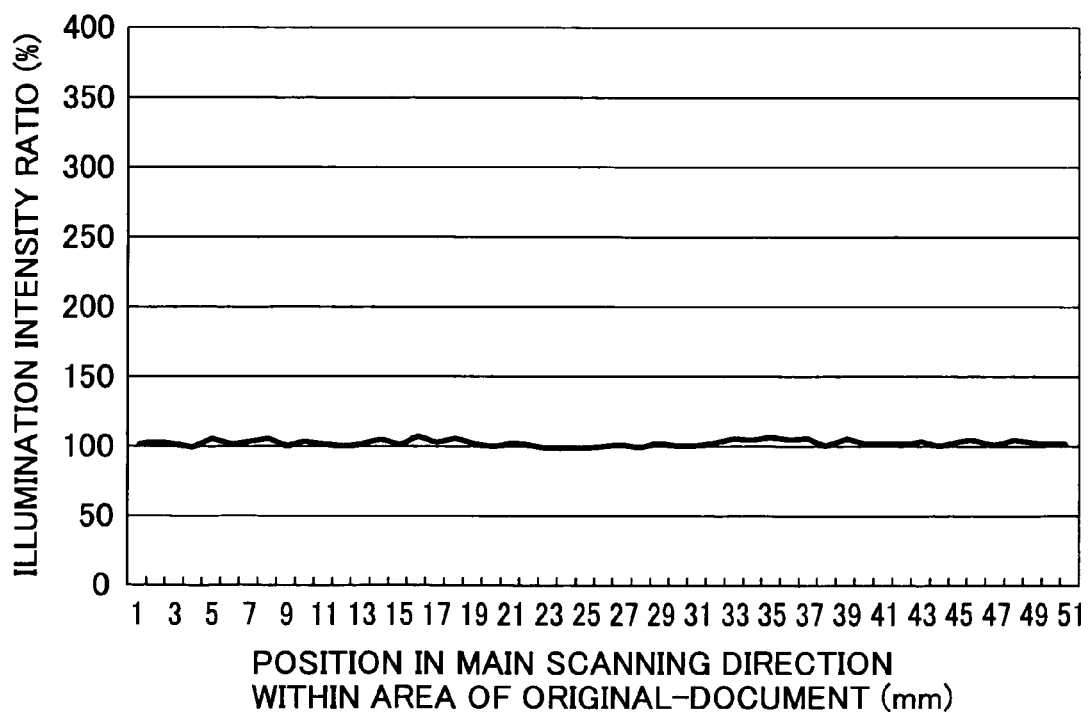
FIG. 16 represents the illumination intensity distribution in the main-scanning direction of the original-document illumination apparatus according to example 3.
Figure 17:
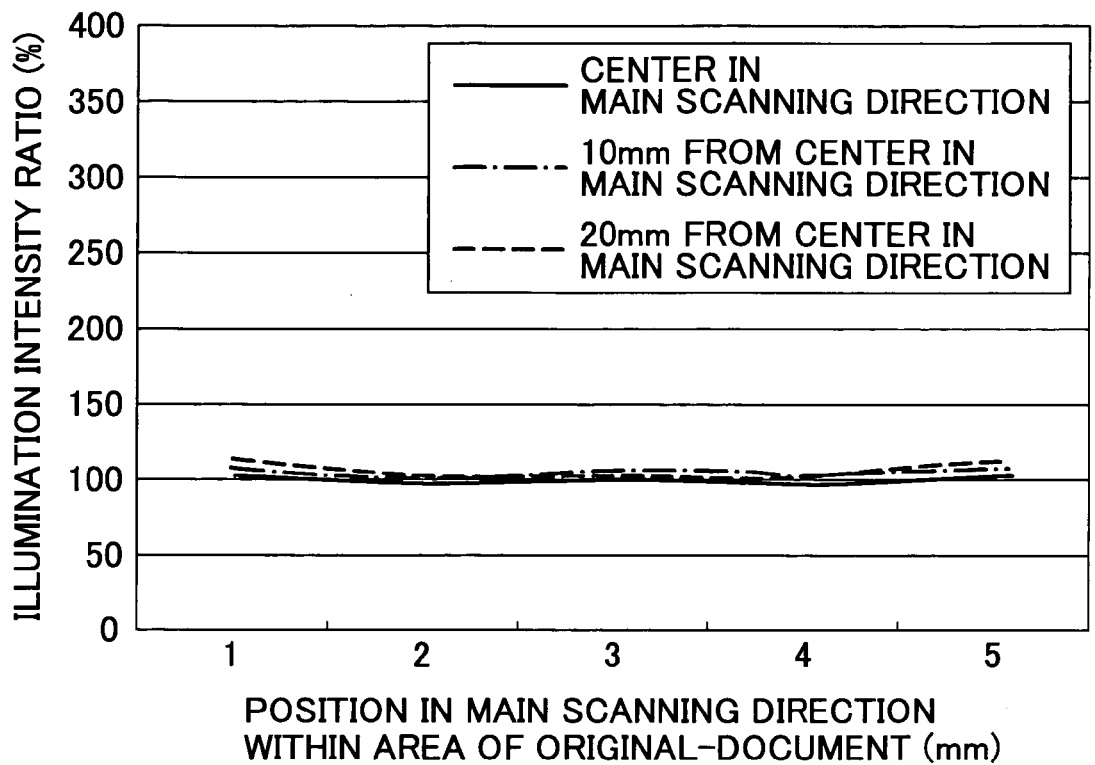
FIG. 17 represents the illumination intensity distribution in the sub-scanning direction of an original-document illumination apparatus according to the example 3.
Figure 18:
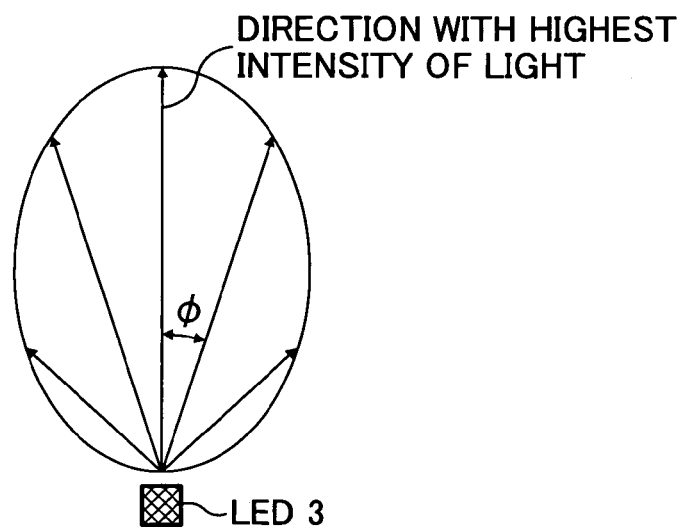
FIG. 18 illustrates basic concept of the luminous intensity distribution of an LED with its light emitting surface covered with a lens.

Each of FIGS. 16 and 17 represents illumination intensity distribution on the area of the original-document, which distribution is obtained by carrying out a ray-trace simulation as in the cases of Examples 1 and 2, and of Comparative Example 1. FIG. 16 represents illumination ratios in the main-scanning direction, and FIG. 17 represents illumination ratios in the sub-scanning direction. The simulation results show that a substantially uniform distribution of illumination intensity in the main-scanning direction is accomplished within the area of the original-document. In addition, FIG. 17 illustrates the illumination intensity distribution in the sub-scanning direction Y. Solid lines in FIG. 18 are obtained by plotting the illumination intensities in the sub-scanning direction Y at the center position of the area of the original-document in the main-scanning direction X. Dashed-dotted lines are obtained by plotting the illumination intensities at a position that is far away, by 10 mm, from the center in the main-scanning direction while the dotted lines are obtained by plotting the illumination intensities at a position that is farther away, by 20 mm, from the center in the main-scanning direction. A smaller drop in light quantity at each end portion is observed than in the case of equal pitched arrangement of the LEDs 3 such as represented in Example 1.

Example 4

LEDs that are currently on the market include products with various types of luminous intensity distribution. In particular, many types of LEDs with covers of a lens on respective light-emitting surfaces are on the market. An LED of one of these types has a luminous intensity distribution that is steeper than Lambert's distribution (for example, see FIG. 18). In an LED with a steep distribution, just a small oblique angle to the direction of the highest light intensity, that is, to the right frontward direction of the LED, causes an immediate drop in light intensity. A drop in light quantity at end portions in the sub-scanning direction is likely to occur when LEDs with such a luminous intensity distribution are installed in the constitution of the apparatus represented in Example 2.

This Example 4 derives from the above-mentioned problem, and proposes a form of the lengthy lens 7, which makes the following possible. While LEDs 3 each of which has Lambert's luminous intensity distribution maintain a uniform distribution of light quantity in the main-scanning direction, the quantity of light is increased at the end portions in the sub-scanning direction to improve the drop in light quantity at the end portions in the sub-scanning direction.

The surface R2 of the lengthy lens 7 of Example 4 has a shape changed from the shape of the surface R2 of the lengthy lens 7 of Example 2. In Example 2, a uniform illumination is carried out onto the area of the original-document. In Example 4, however, the lengthy lens 7 is set so as to accomplish a uniform distribution on the area of the original-document in the main-scanning direction, and to accomplish a rise in light quantity at the end portions in the sub-scanning direction.

Note that when LEDs 3 with a luminous intensity distribution described above are installed, a drop in light quantity at the end portions occurs also in the main-scanning direction. This problem, however, is possible to be easily dealt with by adjusting the arrangement of the LEDs 3, or by adjusting the curvature of the lengthy lens 7 (the terms related to C0 and C1).

In this Example, the state of light-beam convergence is examined in an illumination apparatus with a configuration as described above and under the following conditions.

(Lengthy Lens)

Thickness at the center: 7 (mm)

Width in the main-scanning direction: 135 (mm)

Material: nd=1.491, vd=57.2

Surface R1: cylindrical surface with a 10-mm curvature radius

Surface R2: free-form surface represented by formula (1) with C0=0.1, C1=−0.0009, C2=0.00001

[Mathematical Expression 6]

$$Z = C_0 Y^2 + \sum_{m=1}^{n} C_m X^2 Y^{2m} \quad (1)$$
$$= C_0 Y^2 + C_1 X^2 Y^2 + C_2 X^2 Y^4 + C_3 X^2 Y^6 + \ldots$$

In the above formula, n is any natural number; Z, a coordinate in the direction of the optical axis of the lens; X, a coordinate in the main-scanning direction; and Y, a coordinate in the sub-scanning direction.

(LED)

Number of LEDs: 5

Pitch: 27 (mm)

(Contact Glass)

Thickness at the center: 3.2 (mm)

Material: nd=1.517, vd=64.2

(Relationship Between LED and Surface R1 of the Lens)

Distance: 3.8 (mm)

(Area of the Original-Document)

Position: on the surface of the contact glass

Size: 51 (mm)×5 (mm) (main-scanning direction×sub-scanning direction)

(Conditions for Simulation)

Number of light beams: 3 million

Spectral distribution of the light beams: from 435.83 (nm) to 656.27 (nm)

Figure 19:
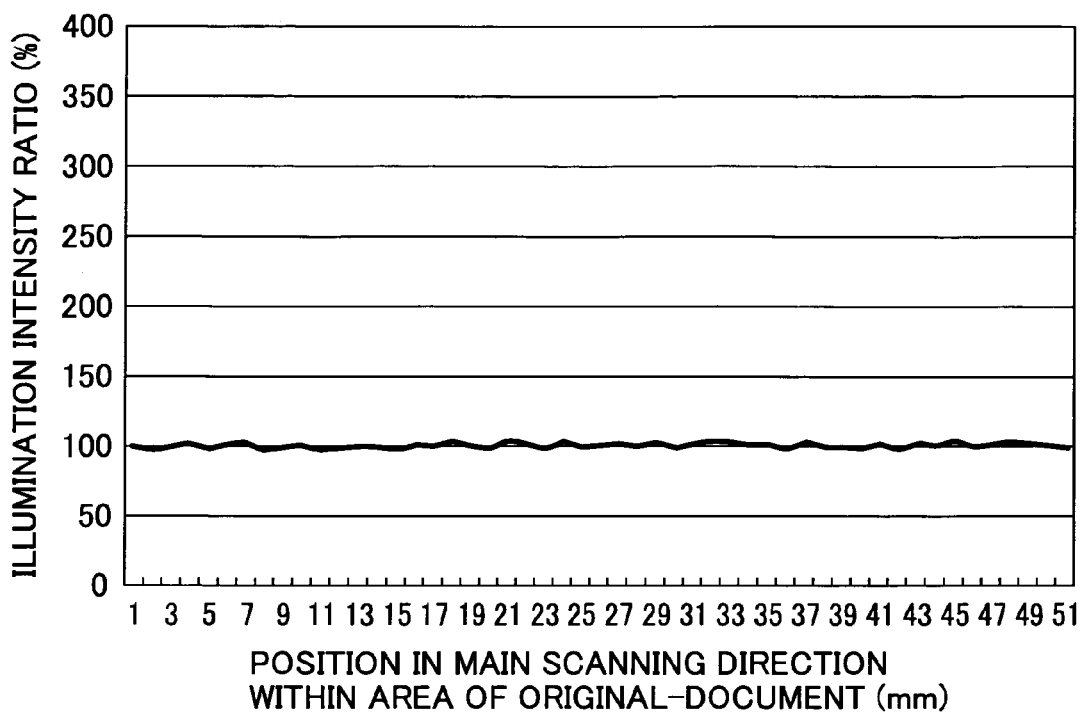
FIG. 19 represents the illumination intensity distribution in the main-scanning direction of an original-document illumination apparatus according to example 4.
Figure 20:
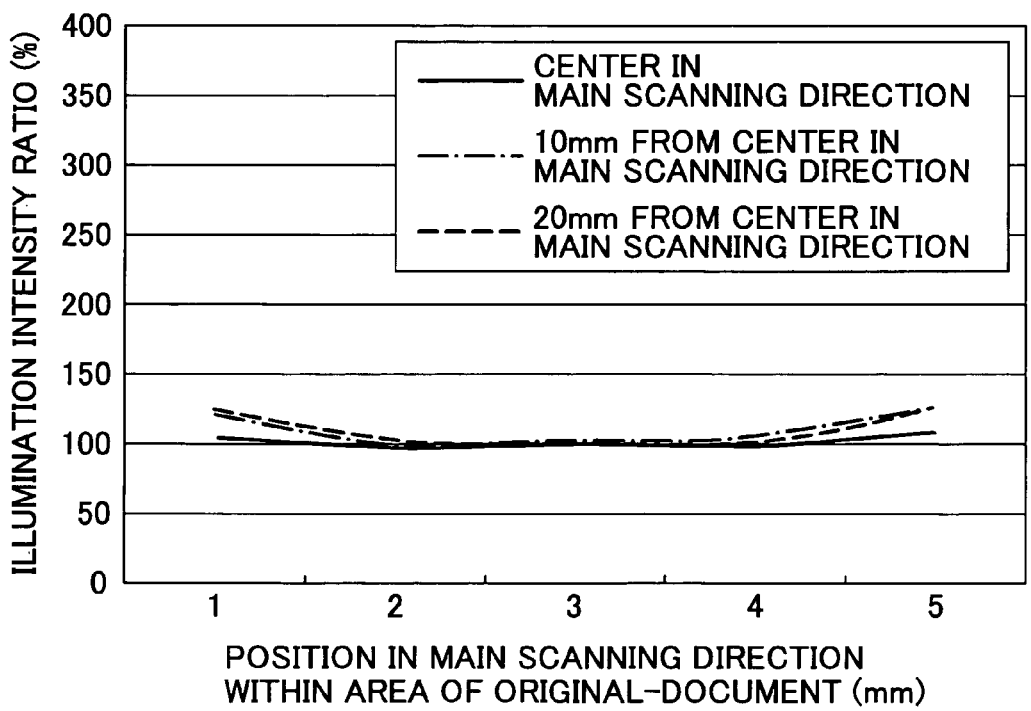
FIG. 20 represents the illumination intensity distribution in the sub-scanning direction of an original-document illumination apparatus according to the example 4.

FIGS. 19 and 20 represent simulation results with this lengthy lens 7. Within the field of the area of the original-document, a substantially uniform distribution of illumination intensity is accomplished in the main-scanning direction while a rise in illumination intensity at the end portion in the sub-scanning direction is observed.

As described in the foregoing, therefore, according to the embodiment of the invention, the illumination intensity on a linear illuminated area that the original-document illumination apparatus has is possible to accomplish more uniform distribution than a conventional case both in the main-scanning direction and in the sub-scanning direction. As a result, a higher quality of read original-documents and original-images is accomplished.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. Moreover, no element or component in the present disclosure is intended to be dedicated to the public regardless of whether the element or component is explicitly recited in the following claims.

What is claimed is:

1. An original-document illumination apparatus illuminating an illuminated area having a length and a width, comprising:
    a light-source unit configured to emit a light flux, and including a plurality of light-emitting elements aligned in a main-scanning direction, wherein a direction of the length is the main-scanning direction and a direction of the width is a sub-scanning direction; and
    a convergent lengthy lens disposed between the illuminated area and the light-source unit, and having a light-incident plane and a light-output plane of the light flux, wherein a longitudinal direction of the convergent lengthy lens corresponds to the main-scanning direction,
    wherein the light flux emitted from the light-source unit is irradiated onto the illuminated area through the lengthy lens, and
    wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and
    wherein the specific light-flux-passing-surface shape cyclically varies in accordance with the positions of the specific light-flux-passing-surface shape in the main-scanning direction.

2. An original-document illumination apparatus illuminating an illuminated area having a length and a width, comprising:
    a light-source unit configured to emit a light flux, and including a plurality of light-emitting elements aligned in a main-scanning direction, wherein a direction of the length is the main-scanning direction and a direction of the width is a sub-scanning direction; and
    a convergent lengthy lens disposed between the illuminated area and the light-source unit, and having a light-incident plane and a light-output plane of the light flux, wherein a longitudinal direction of the convergent lengthy lens corresponds to the main-scanning direction,
    wherein the light flux emitted from the light-source unit is irradiated onto the illuminated area through the lengthy lens, and
    wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and
    wherein a cycle of variation of the specific light-flux-passing-surface shape is equal to arrangement pitches of the light-emitting elements.

3. An original-document illumination apparatus illuminating an illuminated area having a length and a width, comprising:
    a light-source unit configured to emit a light flux, and including a plurality of light-emitting elements aligned in a main-scanning direction, wherein a direction of the length is the main-scanning direction and a direction of the width is a sub-scanning direction; and
    a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and wherein the specific light-flux-passing-surface shape includes an circular arc represented by or approximated by a formula including the curvature radius R, and wherein a following formula is satisfied: $R0 \leq Ri$ where $R0$ is a curvature radius of the specific light-flux-passing-surface shape in the cross-section in the sub-scanning-direction including the light-emitting elements, and $Ri$ is a curvature radius of the specific light-flux-passing-surface shape in any cross-section in the sub-scanning-direction excluding the light-emitting elements.

4. An original-document illumination apparatus illuminating an illuminated area having a length and a width, comprising:

a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and wherein the specific light-flux-passing-surface shape includes a non-circular arc represented by or approximated by a formula including the curvature radius R, and wherein a following formula is satisfied: $R0 \leq Ri$ where $R0$ is a curvature radius of the specific light-flux-passing-surface shape in the cross-section in the sub-scanning-direction including the light-emitting elements, and $Ri$ is a curvature radius of the specific light-flux-passing-surface shape in any cross-section in the sub-scanning-direction excluding the light-emitting elements.

5. An original-document illumination apparatus illuminating an illuminated area having a length and a width, comprising:

a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and wherein a point within the cross-section in the sub-scanning-direction of the lengthy lens, on which point parallel light irradiated from a direction perpendicular to the main-scanning direction onto the light output plane of the lengthy lens converges most, is a convergent point, and wherein a following formula is satisfied: $Bf0 \leq Bfi$ where, $Bf0$ is a distance, within the cross-section in the sub-scanning-direction including the light-emitting elements, between the convergent point and the light incident plane of the lengthy lens, and $Bfi$ is a distance, within any cross-section in the sub-scanning-direction excluding the light-emitting elements, between the convergent point and the light incident plane of the lengthy lens.

6. The original-document illumination apparatus according to claim 1, wherein the lengthy lens includes a plurality of lenses that are bonded together.

7. The original-document illumination apparatus according to claim 1, wherein a length in which the light-emitting elements are aligned in the light-source unit is greater than the length of the illuminated area.

8. An original-document illumination apparatus illuminating an illuminated area having a length and a width, comprising:

a light-source unit configured to emit a light flux, and including a plurality of light-emitting elements aligned in a main-scanning direction, wherein a direction of the length is the main-scanning direction and a direction of the width is a sub-scanning direction; and a convergent lengthy lens disposed between the illuminated area and the light-source unit, and having a light-incident plane and a light-output plane of the light flux, wherein a longitudinal direction of the convergent lengthy lens corresponds to the main-scanning direction, wherein the light flux emitted from the light-source unit is irradiated onto the illuminated area through the lengthy lens, and wherein at least one of the light-incident plane and the light-output plane of the lengthy lens has a shape, within a cross-section in the sub-scanning-direction of the lengthy lens as a specific light-flux-passing-surface shape, which varies in accordance with positions of the shape of the specific light-flux-passing surface in the main-scanning direction, and wherein intervals of arrangement in which the light-emitting elements are arranged satisfy a following formula: $Pn-1 \geq Pn$ where $P0$ is an interval between the adjacent light-emitting elements which are closest to the center of the light-source unit, and Pn (n is an integer equal to or more than one) is an interval between any adjacent light-emitting elements one of which is the closest to an end of the light-source unit.

9. The original-document illumination apparatus according to claim 1, wherein the light-emitting elements each includes a one-chip type white light-emitting diode using a phosphor.

10. The original-document illumination apparatus according to claim 1, wherein the light-emitting elements each includes a white light-emitting diode using two or more chips each of which emits light of a color different from any other colors emitted by other chips, and emitting white light by mixing the colors.

* * * * *